United States Patent Office 2,960,913
Patented Nov. 22, 1960

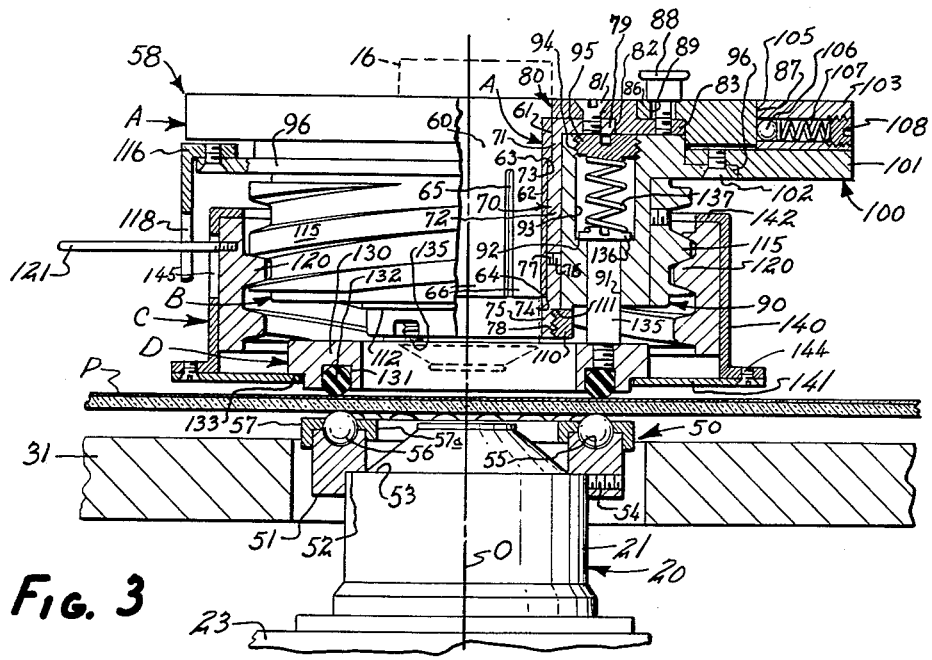

2,960,913

MICROSCOPE MECHANICAL STAGE FOR ROTATING OBJECTS SUCH AS FILM PLATES AND THE LIKE ABOUT THE OPTICAL AXIS OF A MICROSCOPE

Carlo O. Herrala, Walnut Creek, Calif., assignor to The Regents of The University of California, Berkeley, Calif.

Filed Mar. 19, 1957, Ser. No. 647,127

5 Claims. (Cl. 88—40)

This invention relates to a device used in a microscope mechanical stage for rotating objects such as film plates and the like about the optical centerline of a microscope.

While the invention applies to the rotation of an object being studied under a microscope, it should be made clear at the outset that the invention has no relation to the ordinary rotatable stages. Those prior-art stages that rotate about the optical centerline are not applicable to use with a mechanical stage of the translating type; those prior-art rotatable stages that are usable with traversing stages are not set for rotation about the optical centerline. The special type of problem solved by the present invention—a rotator usable with translating stages, which yet rotates about the optical centerline—could not be solved by the prior art rotatable stages. One important field where the problem arises is the study of sub-atomic particle tracks, and it is believed that the invention will be more easily understood after a brief description of the problems in that specific field. However, the invention is not confined to that particular field, for it is useful elsewhere.

Sub-atomic particles are often studied by examining the tracks they produce on the emulsions of specially prepared photographic plates or films as a result of reactions of the sensitized emulsion with atomic nuclei and other sub-atomic particles. In effect, the tracks are a picture of the movements and collisions of these minute particles, and in the study of them the length of each track is of great importance. Since the tracks are very short, they must be studied under powerful microscopes, usually having a magnifying power of 1000X or greater. For this purpose a translatable stage is supported by the microscope for movement along either of two mutually perpendicular axes, usually referred to as the "X-axis" and the "Y-axis." A very fine and accurate screw thread governs the movement, and a vernier calibrator makes it possible to measure a traverse in millionths of an inch.

Important problems which the present invention solves are: (1) an individual track is best studied when its horizontal projection lies parallel to one of the horizontal transverse motions of the microscope stage, and this alignment usually requires some rotation of the film plate relative to the stage; this parallel arrangement is especially convenient in range measurement of long tracks and in multiple scattering (cf. L. Voyvodic, "Progress in Cosmic Ray Physics," edited by J. G. Wilson, North-Holland Publishing Co., Amsterdam, 1954, vol. II, chap. V.); (2) the particle tracks change angle or disperse into several new tracks, as a result of collison between the particle being studied and other sub-atomic particles. By a study of the nuclear track, particularly its length before and after the collison, one can determine what kind of particle struck what other kind of particle, and what happened. So far as the present invention is concerned, the important thing is to be able to rotate the film being studied to accurately align the track in the first place parallel to the X or Y traverse and, later, to rotate the film accurately about the point of collision, that is, the vertex where the particle track changes its angle or disperses. The angle is measured by my device and the linear measurements are resumed when the new path is parallel to one of the axes of the microscope stage. If the rotation is to be done without having to reset either the stage or the film plate, it is vital that the film be rotated about the optical centerline of the microscope.

The prior art rotatable stages are not usable here, because either they are not usable with mechanical stages at all or when they are attached to the X or Y traverse of a complete microscope stage the actual center of rotation does not remain fixed, relative to the optical centerline. While it is possible to make the center of rotation of the stage coincide with the optical axis, this adjustment requires repositioning the film plate to place the desired particle or nuclear track at the optical centerline and this, of course, is impractical.

Summarizing the problem to be solved, the idea is to obtain accurate rotation of the film about the optical axis of a microscope, no matter in what position the translatable stage may be with regard to either its X or Y axis and without interrupting the scanning or requiring any relocation of the particle track.

The main object of the invention, therefore, is to solve the problem of rotating a film plate or the like about the optical axis of the microscope within a mechanical translatable stage.

Another object of the invention is to provide a rotating device for microscopes which guarantees that the rotation will always take place about the optical axis of the microscope objective.

Another object of the invention is to provide a film rotator or the like in which the particle track may be viewed through the microscope during rotation.

Another object of the invention is to provide a simple, mechanical engagement of the film plate by the rotator, which eliminates the need for complicated electromagnetic vacuum systems and the like.

Another object of the invention is to provide a rotator that will not interfere with the normal use of the microscope.

Another object of the invention is to provide a rotator that can easily be applied to existing microscopes with assured accuracy.

Another object of the invention is to provide a rotator that is adaptable to the use of substantially any type of microscope work.

These objects are achieved and the problems discussed above are solved by means of a novel type of rotating device which, in its broad form, may be secured to either the microscope objective or to the microscope condenser or to both, or to some stationary portion of the microscope. In any event, my new rotating device is centered about the optical center of the microscope and is movable up and down relative to the microscope stage. With the film on the stage, a selected particle track parallel to either the X or Y axis is followed by translation along the X or Y axis of the stage, until the track changes angle or disperses. The vertex, the point about which the change in angle takes place, is brought to the optical centerline of the microscope. Then the rotating device is engaged with and secured to the plate. Next, the plate is released from the stage and is moved away from the stage by relative, generally vertical movement of the rotating device. When the plate is thereby freed from the stage, the microscope may be re-focused and then the plate is rotated by turning a portion of the rotating device, while observation through the microscope is continued. When rotation is finished, so that the new track is now parallel to the X or Y axis, the calibrations are read, showing the magnitude of the angle.

When the angle has been measured, the film is moved back onto the stage and re-secured to the stage. Then the rotating device is released from the film and the rotating device moved away from it. The microscope is re-focused and observation under traverse is continued. The same general procedure is followed when aligning a new track parallel to the X or Y axis.

Other objects and advantages of the invention will appear from the following description of a preferred embodiment.

In the drawings:

Fig. 1 is a perspective view of a microscope on which a device embodying the present invention has been installed. Parts of the microscope stage have been broken away in order to show the operation and parts more clearly. As shown, a film plate is clamped in the rotator and lifted above the stage for rotation relative to the stage.

Fig. 2 is a top plan view of the upper part of the rotating device of Fig. 1 applied to the microscope objective tube, some parts of the rotating device being broken away, with portions shown in section. The rotating handle is shown in solid lines in its lower position and in broken lines at the other end of its stroke.

Fig. 3 is a view partly in elevation and partly in section, of the rotating device, taken along the line 3—3 in Fig. 2, but also showing the lower portion and the stage and film plate. To avoid confusion the objective tube is indicated only in broken lines.

Figure 1:
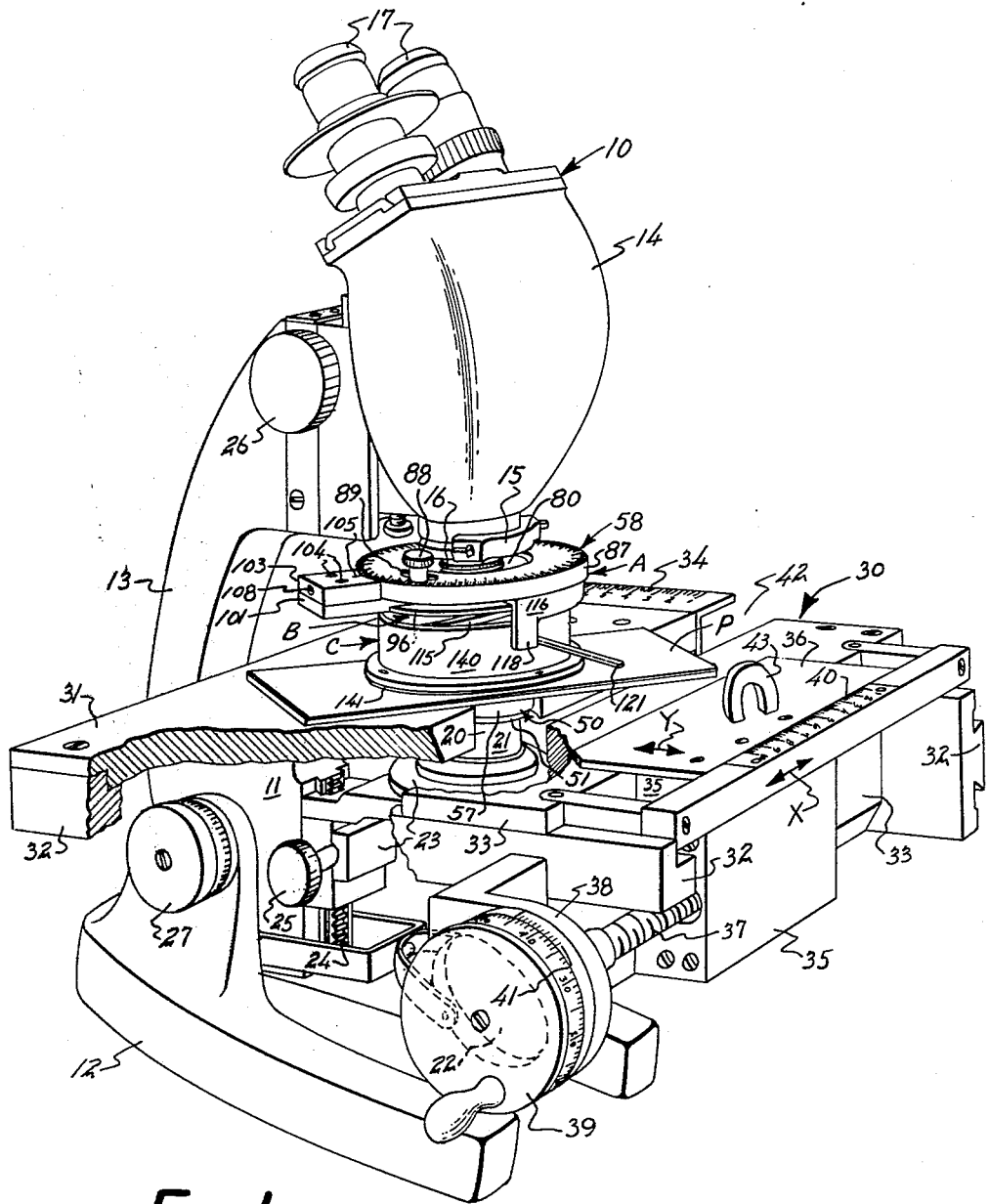

Fig. 1 shows a binocular microscope 10, although the invention is equally applicable to monocular microscopes or any other type that may be made. The microscope 10 has a frame 11 with a base or stand 12, a supporting yoke 13, and a head 14. At the lower end of the head 14 may be secured a conventional quick-change device 15 to which any of several microscope objective tubes 16 may readily be mounted. At the upper end of the head 14 are binocular eye-pieces 17, 17. The objective tube 16 is a cylindrical metal tube containing the objective lenses; it may be noted that the optical axis of the objective lenses rarely coincides with the axis of the tube 16, for the manufacturers usually make no attempt to make them coincide. The problem this creates is solved by certain features of the invention which will be discussed later.

A condenser 20 is mounted directly below the objective 16, their optical axes being in line. Generally speaking, the condenser 20 comprises a generally tubular metal housing 21 containing a condenser lens that focuses light reflected from a mirror 22, so that light from a light source (not shown) is reflected by the mirror 22 up through the condenser 20 and through a film plate P into the microscope objective 16 and, from there, up into the eye pieces 17, 17. Like the objective tube, the condenser housing 21 is not normally centered with respect to the optical axis of the condenser 20.

The condenser 20 is mounted for generally vertical movement up and down, by means of a supporting frame 23 secured to the condenser tube 21. The frame 23 has a pinion (not shown) that rides on a rack 24 secured to the microscope frame 11, when the pinion is rotated by a knurled knob 25. Movement of the pinion serves to raise and lower the condenser 20. Similarly, the microscope objective 16 may be raised and lowered by a rough-focus knob 26 and by a fine-focus knob 27, both used as in the conventional manner.

The film plate P, which may be a glass plate with a specially prepared photographic emulsion for recording particle tracks, is normally supported by a microscope stage 30 which includes a stationary frame 31 that provides a pair of Y-axis ways 32, 32 and is fixed to the microscope frame 11. The ways 32 guide and support a movable sub-frame 33 for movement along the Y-axis toward and away from the yoke 13, a calibrated dial (not shown) being turned to operate a lead screw (not shown), the movement being measured by calibrations 34. All this is well known and conventional.

Translation along the X-axis of the stage 30 may be provided in the conventional manner by a block 35 and plate-supporting member 36, both moved laterally by rotation of a threaded member 37 supported in a Y-frame bracket 38 and turned by a calibrated wheel 39. The plate-supporting member 36 is adapted to move along the X-axis, a calibrated strip 40 giving approximate measurements, while the calibrated dial 39 gives a more exact figure, usually by means of a vernier scale 41.

It will be noted that the stage 30 is split at 42 to provide a large central opening, so that the microscope objective and condenser are not blocked off by the stage in any of its positions. The film plate P is clamped to the plate-supporting member 36 by any suitable means; for example, horseshoe magnets 43 may be used—the magnetic field they exert passing freely through the glass plate P to the stage member 36 and thereby preventing the plate P from moving relatively to the stage 30. Other types of securing means may be provided, such as the spring-loaded blocks that are commonly supplied with microscopes of this type, for while the magnets 43 are convenient, they are not the only feasible clamping means.

Still staying within what the prior art shows, the operation of the device so far described in connection with the study of particle tracks on a film plate is, first, to secure the plate P to the member 36 by the magnets 43 and then to move the member 36 along the stage 30 until a particle track is observed through the eyepieces 17, 17. The plate P is then turned until the track is parallel either to the X-axis or the Y-axis, and then the length of the track is measured along the X-axis or Y-axis, as by turning the handle 39 to translate the member 36. Eventually a vertex of an angle about which the particle moves or where dispersion takes place will move into the field of view and reach the optical axis. The track length is then noted on the vernier scale 41. It is then necessary to rotate the film plate P while keeping the vertex in line with the optical axis. With the translating stage 30 this cannot be done except by turning the plate P manually, or by using very complex vacuum-operated apparatus. No rotating method known heretofore permits studying the track while the rotation is going on, and all the rotating means heretofore known involve inaccuracies or make it impossible to continue scanning the particle while making the change.

The present invention calls for a rotating device to be fixed about the optical centerline; for example, either to the microscope objective tube 16 or to the microscope condenser tube 21, or to both. By way of example, an embodiment showing both will be discussed.

The rotating device includes a bottom element comprising a plate turntable bearing assembly 50, secured to the condenser tube 21. The assembly 50 has a main bearing body or ring 51, generally rectangular in cross-section, with an annular shelf 52 on its lower face adapted to rest on a ledge 53 of the microscope condenser tube 21. A set screw 54 is used to hold the ring 51 securely in place. The upper face of the ring 51 is provided with annular recess 55, semicircular in cross-section. A race of balls 56 rests in the recess 55 and is freely rotatable therein, and a pair of retaining rings 57 and 57a press-fit to the main bearing body 51, serving to keep the balls 56 from falling off.

An important feature of the bearing assembly 50 is that the balls 56 can rotate along any axis and, therefore, the ring 51 does not have to be concentric with the optical center O. This is important, because most condenser tubes are not concentric with the optical axis, though the lenses in them are. This feature of the invention means that the outside of the condenser tube 21 does not have to be machined or other adjustments made to it, because in addition to the rotative movement of the balls 56, the balls 56 are free to resolve forces in any other directions; so rotation will be true and unimpeded whether the optical axis is the same as the center of the ball-bearing race or not. Thus, the ball bearings provide a centerless, low-friction platform for rotation of the plate P.

The upper part 58 of the rotator shown here is, at once, a rotator and a goniometer. It comprises four major parts: (1) a stationary portion A fixed to the microscope objective tube 16; (2) a rotatable portion B which rotates around the fixed portion A; (3) a lowering portion C which goes up and down relative to the rotatable portion B; and (4) a spring-mounted portion D carried by the rotatable portion B and by the lowering portion C, which is free to move up and down as its spring is compressed.

The fixed portion A includes an objective centering sleeve 60 with a smooth inner periphery that fits snugly against the objective tube 16. The sleeve 60 has a stepped outer periphery with an upper thicker portion 61 and a lower thinner portion 62 connected by shelf 63, and it terminates in a lower end 64. A number (preferably three) of longitudinally extending narrow slots 65 extend up from the lower end 64 and provide three segments 66 which are relatively movable radially. This makes it possible to provide an adjustment in fitting the sleeve 60 against the microscope objective tube 16 to take care of the fact that the objective tube is not concentric with the optical axis O of the microscope. Each segment 66 can be moved in toward the center O a different amount than any other segment 66, to aid in this centering operation.

An objective adapter sleeve 70 fits around the objective centering sleeve 60. Its inner periphery is stepped to provide an upper longitudinal portion 71 opposite the upper portion 61 of the objective centering sleeve 60 and a center portion 72 opposite the major lower portion 62 of the sleeve 60, joined by a step 73 opposite and engaging the step 63. The sleeve 70 is additionally stepped in at 74 to engage the lower end 64 of the objective centering sleeve 60 and to join a lower portion 75. A threaded opening 76 is provided opposite leach segment 66, in which a centering screw 77 is threaded, each screw bearing against one of the split segments 66. By turning the screws 77, the objective centering sleeve 60 can be centered to the optical axis O of the microscope objective, rather than just to the tube 16. This refinement, of course, would be unnecessary were the lens itself mounted exactly in the center of the objective tube 16, but this is not generally true in microscopes and will, therefore, normally be required.

The objective adapter sleeve 70 also has an inset exteriorly threaded portion 78 at its lower end and a radially outwardly extending flange 79 at its upper end.

A dial mounting ring 80 may be secured to the flange 79 by screws 81. The ring 80 overlies the full upper surface of the flange 79, has a rim 82 encircling the outer periphery of the flange 79, and is preferably stepped to provide a lower and radially outwardly extending annular flange 83.

A calibrated dial 85 has a relieved radially inner annular portion 86 that overlies and is preferably secured to the upper surface of the flange 83 of the ring 80. The upper surface of the dial 85 is carefully calibrated around its edge, its outer periphery 87 being machined to a true cylindrical shape. By making three separate elements 70, 80, and 85 (plus the centering sleeve 60) the maximum saving is accomplished during calibration and assembly of the device; but the three parts 70, 80, and 85 may be replaced by a single piece if desired.

A dial-zeroing screw 88 with a knurled knob is preferably provided to extend through a slot 89 in the calibrated dial and threaded into the flange 83; when the dial 85 is adjusted to exactly the proper position to provide a zero reading, the screw 88 is tightened by turning the knob, until the base of the knob engages the dial 85 and clamps it to the ring 80.

The parts so far discussed comprise the stationary portion A of the rotating apparatus 58. In other words, the objective centering sleeve 60, objective adapter sleeve 70, dial mounting ring 80, and calibrated dial 85, once installed and adjusted about the optical center, are fixed in relation to the microscope objective tube 16 and remain fixed. They do not move rotatably nor up and down relative to the tube 16. They provide at once the attachment to the microscope objective 16 and the calibration for the rotational movement of the rotator B; and, of course, they also provide means for adjusting the zero-point and for adjusting the device to the optical center O of the microscope.

The rotator B includes a main rotator body 90, in the general form of a sleeve, fitting closely but rotatably around the smooth outer periphery of the objective adapter sleeve 70, and nesting closely though rotatably against the lower surfaces of the objective adapter flange 79 and the dial mounting flange 83. The rotator body 90 is preferably provided with three through openings 91 which are used in connection with plungers 135 to obtain alignment with the spring-mounted portion D. Each opening 91 has a step 92 where the opening 91 widens out to an upper portion 93, and the upper end 94 of the portion 93 is threaded to receive a spring-retaining screw 95.

The rotator body 90 is also provided with a radially outwardly extending flange 96 which underlies the calibrated dial 85. To this flange 96 is secured an indexed tab 100 which is preferably made in two pieces; the lower piece 101 being secured as by a screw 102 to the rotator flange 96, and the upper piece 103 being secured to the lower piece 101 by other screws 104. Preferably, the upper piece 103 is provided with a single index mark 105 for use with the calibrated dial 85. The screws 104 which join the lower and upper pieces 101 and 103 together are preferably inserted from above through a slot in the upper member 103, so that the pieces 101 and 103 provide a very close engagement of the index tab 100 with the calibrated dial 85. Moreover, a brake comprising a ball 106, spring 107, and threaded closure member 108, is supplied to insure contact at low friction between the index tab 100 and the outer periphery of the calibrated dial 85. The very close adjustment makes it possible to read the dial 85 accurately without parallax.

The lower end of the rotating body 90 is supported by a locking thrust-bearing 110 which is threaded around the lower threaded end 75 of the objective-adapter sleeve 70. The upper end of the thrust-bearing 110 is smooth, its radially inner portion bearing against a shelf 111 on the sleeve 70, while its radially outer portion engages a smooth bearing portion 112 of the rotator body 90. Thus, to rotate the rotator body 90, all one has to do is to grasp the index tab 100 and turn it. Since the parts which the body 90 surrounds are fixed, rotation will take place, the flat bearing surface 112 moving over the locking thrust-bearing 110 and while cylindrical bearing surface of the rotator 90 moves around the sleeve 70.

The raising and lowering device C is provided partly by a set of screw threads 115 forming part of or secured to and moving only with the rotating body 90. Preferably, the threads 115 are triple lead acme threads, to enable a rapid movement with a small rotational movement. Also an arcuate member 116 is secured to the outer periphery of the flange 96, its depending stops 117 and 118 serving a purpose soon to be seen.

A mating gland or lowering screw 120 engages the stationary fixed screw 115 on the rotator 90, and a lowering handle 121 is preferably threadably secured in the side wall of the mating gland 120. This means that, when the handle 121 is turned, there will be a raising or lowering of the gland 120 relative to the fixed screw 115 and the rotator 90, while the rotator 90 itself remains stationary, so far as its vertical position is concerned, though it is rotatable. The stops 117 and 118 engage the handle 121 and define the limits of its stroke and therefore limit the motion of the gland 120 so that it will not come off the threads 115.

The spring-mounted plate-engaging device D comprises, first of all, an O-ring adapter 130, an annular member, preferably generally rectangular in cross-section, provided with an annular groove 131 in which is secured an O-ring 132, which may be held therein by cement or by a close fit and by being stretched when inserted into the groove 131. The adapter 130 is also provided with a radially outer annular shelf 133 on its lower surface. A set of three (or more) plungers 135 are secured to the adapter 130 and extend up through the openings 91. Each plunger 135 has an upper head 136 which is adapted to seat against the shelf 92 to limit downward movement of the plungers 135 and adapter 130. The plungers 135 can move upwardly, since the inner periphery of the O-ring adapter 130 is larger than that of the locking thrust-bearing 110; motion upward is opposed by the compression of springs 137 which normally urge the plungers 135 downwardly, the springs being compressed between the plunger heads 136 and the adjustable spring-retaining screws 95.

In assembly of this portion of the device, the plungers 135 are inserted through the openings 91 through the rotator body 90 and then threaded on the adapter 130. Then the springs 137 and spring-retaining screws 95 are inserted.

The mating gland 120 is preferably linked to the spring-mounted O-ring adapter 130 by means of a carrier ring 140 and a lower annular member or keeper ring 141. The carrier ring has an upper, radially inwardly extending flange 142 that enables it to ride on the upper surface of the gland 120 and a radially outwardly extending flange 143 on its other end where it is secured to the keeper ring 141. The keeper ring 141 itself fits snugly in the annular shelf 133 and is held there by the pressure of the springs 137. For assembly of this portion, the handle 121 is not put in place until the carrier ring 140 is in place around and over the gland 120, and then the handle 121 is inserted through a slot 145 in the carrier ring 140 and screwed into the gland 120. The keeper ring 141 is put in place on the adapter 130 and, with the gland 120 threaded onto the threads 115, the ring 141 is secured to the carrier ring flange 143 by suitable screws 144. A vertically extending slot 145 permits later free axial movement within limits defined by the ends of the slot, of the adapter 130 relative to the gland 120.

In operation, the film plate P is normally secured to the stage plate member 36, as by the magnets 43, and a track is traversed. The moment a vertex is reached, the lowering handle 121 is grasped and used to turn the lowering screw 120, with the result that the O-ring 132 is lowered against the film plate P and engages it. The plate P may then be released from the stage by removing the magnets 43. Then the knob 25 is turned to raise the condenser 20 and the bearing assembly 50, which then engages the plate. The condenser 20 is then raised a few thousandths of an inch more so that the bearing assembly 50 raises the plate P off the stage member 36, pushing the O-ring 132 up against the pressure of the springs 137 on the plungers 135. Then the microscope is refocused. With the film plate P raised off the stage and held between the ball-bearing 56 and the O-ring 132, the index tab 100 is used as a handle to rotate the plate P while the observer studies the track through the eyepieces 17. In this manner, he turns the plate P until the new line B is parallel to the X or Y axis, usually indicated by index lines or cross-hairs in one eyepiece 17.

Then the knob 25 is turned to lower the condenser 20, the bearing assembly 50, and the film plate P, while the springs 137 keep the O-ring 132 in contact with the plate P. When the film plate P rests against the stage member 36, it may be locked to it by the magnets 43. When the condenser 20 is lowered sufficiently to free the plate P from the bearing assembly 50, the lowering screw 120 is raised by moving the handle 121 to lift the O-ring 132 off the plate. Thus the angle has been turned, the microscope is refocused, and new translation may be done along the track B by using the stage in the normal manner.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting. For example, the device may be reversed or inverted, with the bearing ring secured to the objective and the rotator to the condenser. Other types of bearing rings and other types of rotators may be used. With a rotator secured to either the condenser or objective, a magnetic clamp member may be used which is not secured to either the objective or condenser but is held by a magnetic field passing through the film plate. All these are modifications that will occur to the man in the art, who will naturally choose the one best suited to his situation, in the light of the specific example I have given.

I claim:

1. In a microscope having a lens tube with a condenser lens therein, and a second lens tube with an objective lens therein, means to raise and lower said lens tubes, and a mechanical translatable stage with means for releasably securing a plate to said stage, the combination of: a plate turntable bearing assembly, comprising a ball bearing race supported by and projecting beyond one said lens tube and movable therewith; a fixed sleeve-like unit secured around the other said lens tube coaxial with the optical axis of said microscope, said fixed unit having at one end a dial with a cylindrical periphery and calibrations adjacent said periphery; a rotator mounted for rotation around said sleeve coaxial with said optical axis, said rotator having an index tab located opposite said calibrations for movement around said cylindrical periphery; raising and lowering means connected to said rotator, for relative axial movement; an annular clamp member adapted to engage the upper surface of said plate; first, yieldable, lost-motion means connecting said clamp member to said rotator; a second lost-motion means connecting said clamp member to said raising and lowering means whereby, by moving said raising and lowering means, said clamp means may be brought into engagement with the one surface of said plate and, by moving said one said lens tube, said ball-bearing race may be brought into engagement with the other surface of said plate and upon further movement of said one said lens tube, said plate is moved off said stage, and then said plate may be rotated by moving said tab, said plate being later returned to said stage by moving said one said lens tube in the opposite direction.

2. In a microscope having a condenser tube with a condenser lens therein, means to raise and lower said condenser tube, an objective tube with an objective lens therein, and a mechanical translatable stage with means for releasably securing a plate to said stage, the combination of: a plate turntable bearing assembly, comprising a ball bearing race supported by and projecting above said condenser tube and movable therewith; a fixed sleeve-like unit secured around said objective tube coaxial with the optical axis of said objective lens, said fixed unit having at its upper end a dial with a cylindrical periphery and calibrations on the upper face thereof adjacent said periphery; a rotator mounted for rotation around said sleeve coaxial with said optical axis and having screw thread means around its outer periphery; an index tab secured to said rotator and located opposite said calibrations for movement with said rotator around said dial periphery; bearing means secured to the lower end of said objective-adapter sleeve for supporting said rotator; a lowering screw threadably engaged with said screw thread means; a carrier ring fitting loosely around said lowering screw for limited movement in an axial direction with respect thereto; an annular O-ring adapter supported by said carrier ring and having a resilient O-ring on its lower surface adapted to engage the upper surface of said plate; linking means connecting said O-ring adapter to said rotator by a lost-motion, resilient connection; whereby, by moving said lowering screw, said O-ring may be brought into engagement with the upper surface of said plate and by raising said condenser tube said ball-bearing race may be brought into engagement with the lower surface of said plate; upon further raising of said condenser tube said plate is lifted off said stage and then said plate may be rotated by moving said tab, said plate being later lowered to said stage by lowering said condenser tube.

3. In a microscope having a condenser tube with a condenser lens therein, means to raise and lower said condenser tube, an objective tube with an objective lens therein, means to raise and lower said objective tube, and a mechanical translatable stage with means for releasably securing a plate to said stage, the combination of: a plate turntable bearing assembly, comprising a ball-bearing race supported by and projecting above said condenser tube and movable therewith; a fixed sleeve-like unit secured around said objective tube coaxial with the optical axis of said objective lens, said fixed unit having an outer periphery and, at its upper end, a radially outwardly extending annular flange with a cylindrical periphery and calibrations on the upper face thereof adjacent said cylindrical periphery; a rotator mounted for rotation around said sleeve outer periphery coaxial with said optical axis and having screw thread means around its outer periphery and axially extending openings through said rotator; an index tab secured to said rotator and located opposite said calibrations for movement with said rotator around said flange cylindrical periphery; a keeper ring secured to the lower end of said objective-adapter sleeve and supporting said rotator; a lowering screw threadably engaged with said screw thread means; a carrier ring fitting loosely around said lowering screw for limited movement in an axial direction with respect thereto; an annular O-ring adapter supported by said carrier ring and having a resilient O-ring on its lower surface adapted to engage the upper surface of said plate; spring urged linking means secured to said O-ring adapter and extending into said axially extending openings and connected to said rotator by a lost-motion, resilient connection; whereby, by moving said lowering screw, said O-ring may be brought into engagement with the upper surface of said plate and, by raising said condenser tube, said ball-bearing race may be brought into engagement with the lower surface of said plate; upon further raising of said condenser tube, said plate is lifted off said stage, and then said plate may be rotated by moving said tab, said plate being later lowered to said stage by lowering said condenser tube.

4. In a microscope having a condenser tube with a condenser lens therein, means to raise and lower said condenser tube, an objective tube with an objective lens therein, and a mechanical translatable stage with means for releasably securing a plate to said stage, the combination of: a plate turntable bearing assembly, comprising an annular body secured to said condenser tube and movable therewith, a race of balls mounted in an annular groove on the upper surface of said body, and keeper means holding said balls on said body; an objective-centering sleeve having a plurality of generally axially extending slots extending up from its lower end to provide a plurality of relatively movable segments adjustably secured to said objective tube so that said sleeve's outer periphery is coaxial with the optical axis of said objective lens; an objective-adapter sleeve secured around said objective-centering sleeve and having adjusting means bearing against each said segment, said objective adapter sleeve having a cylindrical outer periphery and at its upper end a radially outwardly extending annular flange; a dial mounting ring secured to said flange; a calibrated dial mounted on said ring and having an arcuate slot therethrough; a dial zeroing screw extending through said slot and threaded into said ring and having a head adapted to bear on said dial; a rotator mounted for rotation around said sleeve outer periphery coaxial with said optical axis and having screw threads around its outer periphery and at its upper end a radially outwardly extending tab flange and having a plurality of stepped openings extending axially therethrough with upper portions wider than their lower portions; an index tab secured to said tab flange and lying opposite said dial outer periphery; a keeper ring secured to said objective adapter sleeve and supporting said rotator; a mating gland for said screw thread and having a handle fixed thereto; a carrier ring having an upper radially inwardly extending flange adapted to overlie loosely the upper end of said gland, a lower radially inwardly extending flange, and an axial slot through which said handle extends; an annular O-ring adapter supported by said carrier ring and having a resilient O-ring supported on its lower surface and adapted to engage the upper surface of said plate; a plurality of plungers secured to said O-ring adapter and extending upwardly one into each said stepped opening, each plunger having stop means adapted to engage said steps; spring-retaining means at the upper ends of said stepped openings; and springs compressed between said spring-retaining means and said plungers, whereby, by moving said handle to lower said gland, said O-ring may be brought into engagement with the upper surface of said plate and, by raising said condenser tube, said balls may be brought into engagement with the lower surface of said plate; upon further raising of said condenser tube, said plate is lifted off said stage, compressing said springs, and then said plate may be rotated by moving said tab, said plate being later lowered to said stage by lowering said condenser tube.

5. In a microscope having a condenser tube with a condenser lens therein, means to raise and lower said condenser tube, an objective tube with an objective lens therein, and a mechanical translatable stage with means for releasably securing a plate to said stage, the combination of: a plate turntable bearing assembly, comprising an annular body member fitting around said condenser tube, said body having a set screw for securing it thereto for movement therewith, and having an annular groove on its upper surface, a race of bearing balls mounted in said groove, and inner and outer keeper rings press fit to said body and holding said balls on said body; an objective-centering sleeve having a smooth cylindrical inner periphery fitting around said objective tube, and a stepped outer periphery providing a lower thinner cylindrical portion having a plurality of slots extending up from its lower end to provide a plurality of relatively movable segments and an upper thicker cylindrical portion; an objective-adapter sleeve secured around said objective centering sleeve and having a cylindrical outer periphery and a stepped inner periphery comprising an upper portion opposite said objective-centering sleeve upper portion, a middle portion opposite said segments, and having radially extending set screws threaded therethrough, each screw bearing against a said segment for moving them in against said objective tube, by which the outer periphery of said objective adapter sleeve can be made coaxial with the optical axis of said objective lens, and a lower portion below said objective centering sleeve with a shelf supporting it and a threaded inset outer periphery there, said objective-adapter sleeve having at its upper end a radially outwardly extending annular flange; a dial mounting ring secured to said flange over and around said flange and having a recessed outer peripheral flange; a dial mounted on said ring flange and having an arcuate slot therethrough and calibrations on its edge adjacent an outer cylindrical periphery; a dial zeroing screw extending through said slot and threaded into said ring and having a head adapted to bear on said dial; an annular sleeve-like rotator body mounted for rotation around said sleeve outer periphery coaxial with said optical axis and having a triple lead acme screw thread around its outer periphery and a radially outwardly extending tab flange at its upper end, said body having three stepped axially extending through-openings whose upper portions are of wider diameter than the lower portions; an index tab secured to said tab flange and positioned opposite the outer periphery of said dial; a keeper ring threaded on the lower end of said objective-adapter sleeve and supporting said rotator as a thrust bearing; a mating gland for said screw thread; having a handle fixed thereto; a pair of stops for said handle secured to said tab flange and engaged by said handle at limits of the stroke; a carrier ring having an upper radially inwardly extending flange adapted to overlie loosely the upper end of said gland, a lower radially outwardly extending flange, and an axial slot through which said handle extends; a support ring secured to said lower flange; an annular O-ring adapter supported by said carrier ring and having a resilient O-ring supported on its lower surface, a shelf on its lower surface for support by said support ring, said O-ring being adapted to engage the upper surface of said plate; three plungers secured to said O-ring adapter and extending axially upwardly into said stepped openings, each plunger having an enlarged head at its upper end serving as a stop for said plunger by engaging the step of said opening, a nut closing the upper end of each said stepped opening; and a spring compressed between each said nut and a said head, whereby, by moving said handle to lower said gland, said O-ring may be brought into engagement with the upper surface of said plate and, by raising said condenser tube, said balls may be brought into engagement with the lower surface of said plate and then, upon further raising of said condenser tube, said plate is lifted off said stage, compressing said springs, and then said plate may be rotated by moving said index tab, said plate being later lowered to said stage by lowering said condenser tube.

References Cited in the file of this patent

UNITED STATES PATENTS

| | | |
|---|---|---|
| 354,130 | Griffith | Dec. 14, 1886 |
| 2,003,387 | Ott | June 4, 1935 |
| 2,135,870 | Fassin | Nov. 8, 1938 |
| 2,301,935 | Ehringhaus | Nov. 17, 1942 |
| 2,637,244 | McLeod | May 5, 1953 |

OTHER REFERENCES

Arrangement for Precise Scattering Measurements in Nuclear Emulsions, Stodiek, Il Nuovo Cimento, vol. II, No. 3, September 1955, pages 467–470.